US012780248B2

(12) United States Patent
Mitsui et al.

(10) Patent No.: US 12,780,248 B2
(45) Date of Patent: Nov. 3, 2026

(54) VEHICLE CONTROL DEVICE, CONTROL METHOD, AND COMPUTER READABLE MEDIUM STORING CONTROL PROGRAM

(71) Applicant: HONDA MOTOR CO., LTD., Tokyo (JP)

(72) Inventors: Tomokazu Mitsui, Tokyo (JP); Yuki Kizumi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/064,725

(22) Filed: Feb. 27, 2025

(65) Prior Publication Data

US 2025/0304104 A1 Oct. 2, 2025

(30) Foreign Application Priority Data

Mar. 28, 2024 (JP) ................................ 2024-054214

(51) Int. Cl.

| | |
|---|---|
| ***B60W 40/04*** | (2006.01) |
| ***B60W 60/00*** | (2020.01) |
| ***G08G 1/095*** | (2006.01) |
| ***G08G 1/0967*** | (2006.01) |

(52) U.S. Cl.

CPC ....... *B60W 60/001* (2020.02); *B60W 2552/10* (2020.02); *B60W 2555/60* (2020.02)

(58) Field of Classification Search

CPC ........... B60W 60/001; B60W 2552/10; B60W 2555/60; B60W 2420/403; B60W 2552/53; B60W 40/04; B60W 60/0015; G08G 1/0967; G08G 1/095

USPC ........................................................... 701/25

See application file for complete search history.

(56) References Cited

U.S. PATENT DOCUMENTS

| | | | | |
|---|---|---|---|---|
| 11,845,428 | B2 * | 12/2023 | Kim | B60W 10/18 |
| 12,326,337 | B2 * | 6/2025 | Kim | G01C 21/005 |
| 2017/0103275 | A1 * | 4/2017 | Yamanoi | G06V 20/588 |
| 2021/0374434 | A1 * | 12/2021 | Tanikawa | G06V 20/588 |
| 2022/0402492 | A1 * | 12/2022 | Sakakura | B60W 30/165 |

FOREIGN PATENT DOCUMENTS

| | | | | |
|---|---|---|---|---|
| JP | 6337961 | B2 | | 6/2018 |
| JP | 2020-160560 | A | | 10/2020 |
| JP | 2021-189883 | A | | 12/2021 |
| JP | 2022161700 | A | * | 10/2022 |

OTHER PUBLICATIONS

Nov. 25, 2025, Translation of Japanese Office Action issued for related JP Application No. 2024-054214.

* cited by examiner

*Primary Examiner* — Hossam M Abd El Latif

(74) *Attorney, Agent, or Firm* — Paratus Law Group, PLLC

(57) ABSTRACT

A vehicle control device for controlling a vehicle, includes: a recognition unit configured to recognize a surrounding situation of the vehicle; a deviation calculation unit configured to, in a case where a traffic light is recognized by the recognition unit, calculate a deviation amount of the traffic light relative to a travel path on which the vehicle travels; a determination unit configured to determine whether the traffic light is a traffic light corresponding to the travel path based on the deviation amount calculated by the deviation calculation unit; and a vehicle control unit configured to control the vehicle based on a determination result of the determination unit.

15 Claims, 10 Drawing Sheets

(FIG. 1 CONTINUED)
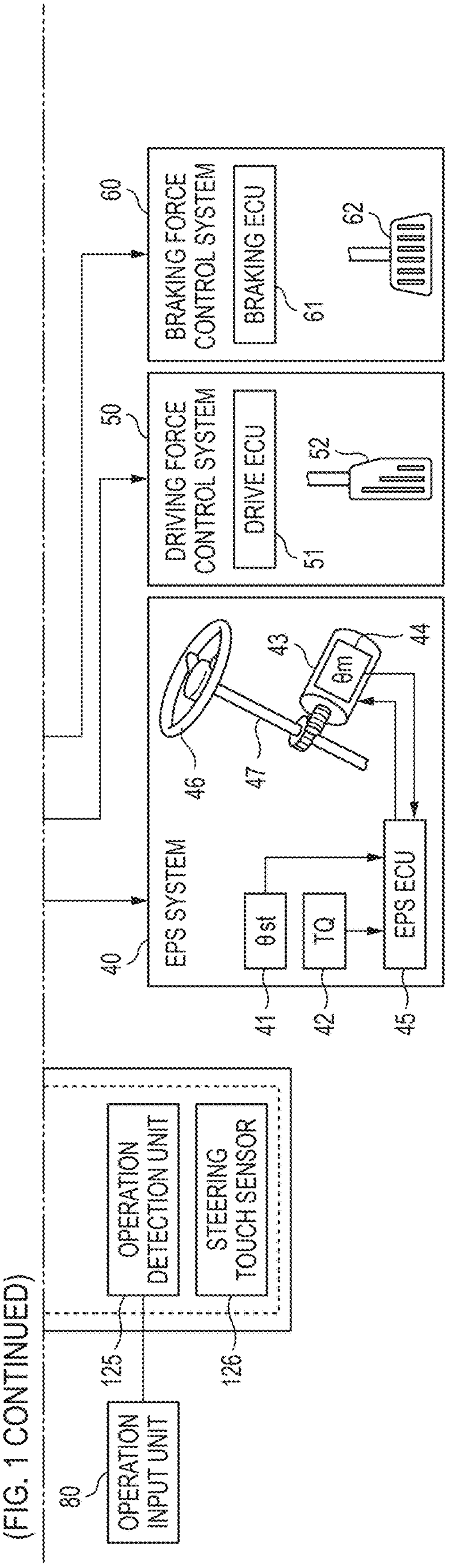

(CONT.)

(FIG. 7 CONTINUED)
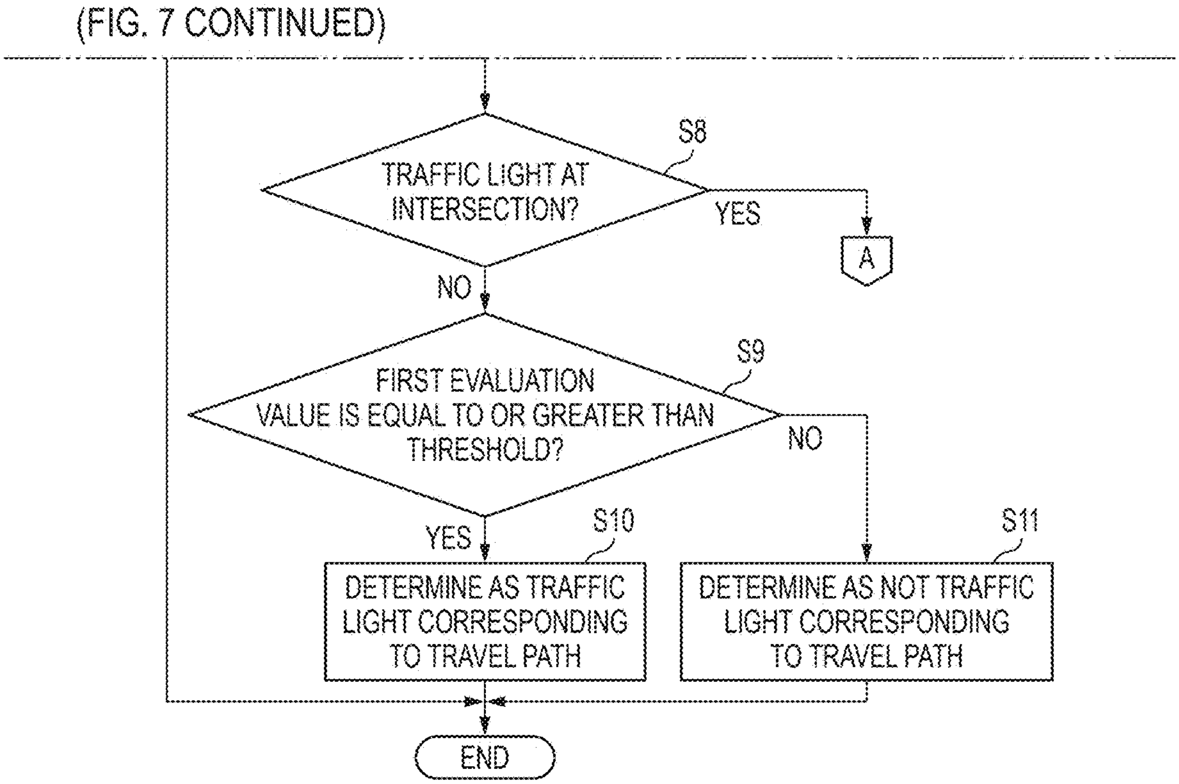

VEHICLE CONTROL DEVICE, CONTROL METHOD, AND COMPUTER READABLE MEDIUM STORING CONTROL PROGRAM

CROSS-REFERENCE TO RELATED APPLICATION

This application is based on and claims priority under 35 USC 119 from Japanese Patent Application No. 2024-054214 filed on Mar. 28, 2024.

TECHNICAL FIELD

The present invention relates to a vehicle control device, a control method, and a computer readable medium storing a control program for controlling a vehicle.

BACKGROUND ART

In recent years, active efforts have been made to provide access to a sustainable transportation system in consideration of vulnerable traffic participants. As one of these efforts, research and development on driving assistance techniques and autonomous driving techniques for vehicles such as automobiles have been made in order to further improve safety and convenience of traffic.

As an example of the driving assistance technology, the following Patent Literature 1 discloses a technique of: identifying two or more traffic lights predicted to appear in an image obtained by imaging the surroundings of a vehicle from a position of the vehicle itself and map information including position information on traffic lights around the vehicle; setting a priority order among the two or more identified traffic lights based on a possibility that the traffic lights are shielded; and detecting a traffic light having a highest priority order among the two or more traffic lights from the image.

PATENT LITERATURE

Patent Literature 1: JP6337961B

SUMMARY OF INVENTION

However, the conventional art described above assumes using map information including the position information on the traffic lights around the host vehicle. Therefore, for a vehicle without being provided with the position information on the traffic lights in advance, it may be not possible to perform appropriate control according to the traffic lights corresponding to the travel path on which the host vehicle travels.

The present invention provides a vehicle control device, a control method, and a computer readable medium storing a control program that enable appropriate control according to traffic lights corresponding to a travel path on which the host vehicle travels even if no position information on the traffic lights is prepared in advance. This further improves safety of traffic and contributes to development of a sustainable transportation system.

An aspect of the present invention is a vehicle control device for controlling a vehicle, including:

- a recognition unit configured to recognize a surrounding situation of the vehicle;
- a deviation calculation unit configured to, if a traffic light is recognized by the recognition unit, calculate a deviation of the traffic light relative to a travel path on which the vehicle travels;

- a determination unit configured to determine whether the traffic light is a traffic light corresponding to the travel path based on the deviation; and
- a vehicle control unit configured to control the vehicle based on a determination result of the determination unit.

Another aspect of the present invention is a control method including, by a computer for controlling a vehicle:

- recognizing a surrounding situation of the vehicle;
- if a traffic light is recognized, calculating a deviation of the traffic light relative to a travel path on which the vehicle travels;
- determining whether the traffic light is a traffic light corresponding to the travel path based on the deviation; and
- controlling the vehicle based on a determination result of the determination.

Another aspect of the present invention is a computer readable medium storing a control program for causing a computer for controlling a vehicle to perform processing including:

- recognizing a surrounding situation of the vehicle;
- if a traffic light is recognized, calculating a deviation of the traffic light relative to a travel path on which the vehicle travels;
- determining whether the traffic light is a traffic light corresponding to the travel path based on the deviation; and
- controlling the vehicle based on a determination result of the determining.

According to the present invention, it is possible to provide a vehicle control device, a control method, and a computer readable medium storing a control program that enable appropriate control according to traffic lights corresponding to a travel path on which a host vehicle travels even if no position information on the traffic lights is prepared in advance.

DESCRIPTION OF EMBODIMENTS

Hereinafter, an embodiment of a vehicle control device, a control method, and a control program of the present invention will be described with reference to the drawings. The drawings are viewed in directions of reference signs. The following embodiment does not limit the present invention, and not all elements described in the following embodiment are essential to the present invention. Further, two or more elements described in the following embodiment may be freely combined without departing from the gist of the present invention. Hereinafter, the same or similar elements are denoted by the same or similar reference signs, and description thereof may be omitted or simplified.

In addition, in the present specification, in order to simplify and clarify the description, the directions including front and rear, left and right, up and down directions are described in accordance with a direction viewed from a driver who is an occupant of a vehicle (that is, vehicle 1 to be described later) controlled by a control device (that is, the control device 30 described later) which is an embodiment of the vehicle control device of the present invention, unless otherwise specified.

[1. Vehicle]

Figure 1:
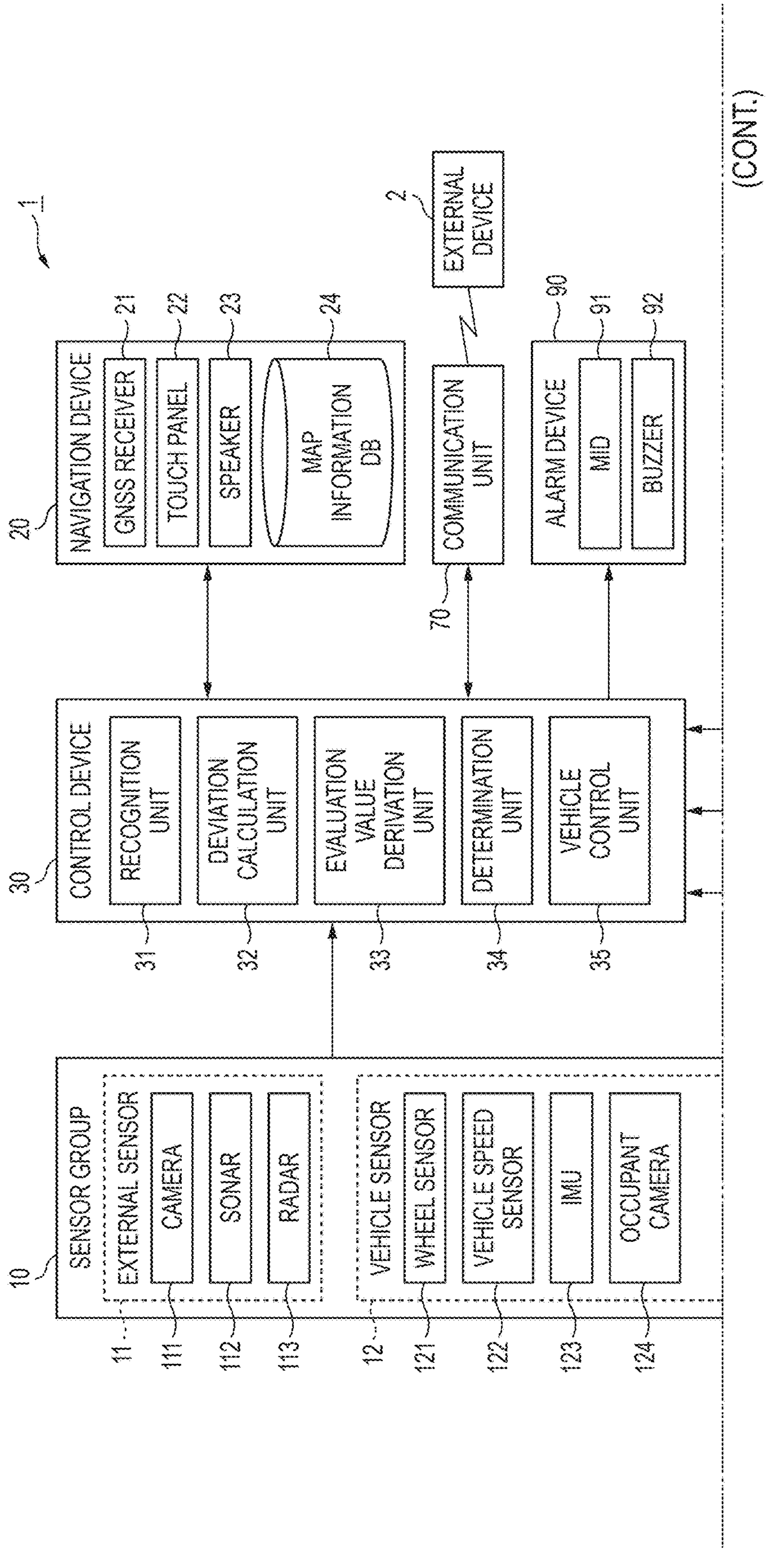
FIG. 1 is a block diagram illustrating a schematic configuration of a vehicle 1 including a control device 30 that is an embodiment of a vehicle control device of the present invention.

FIG. 1 is a block diagram illustrating a schematic configuration of a vehicle 1 including a control device 30 that is an embodiment of a vehicle control device of the present invention. A vehicle 1 according to the present embodiment illustrated in FIG. 1 (hereinafter, also referred to as a "host vehicle") is an automobile including a drive source (not illustrated), and wheels (not illustrated) including drive wheels driven by power of the drive source and steered wheels that are steerable. As an example, the vehicle 1 may be a four-wheeled automobile having a pair of left and right front wheels and a pair of left and right rear wheels.

The drive source of the vehicle 1 may be an electric motor, an internal combustion engine such as a gasoline engine or a diesel engine, or a combination of an electric motor and an internal combustion engine. The drive source of the vehicle 1 may drive the pair of left and right front wheels, the pair of left and right rear wheels, or the four wheels including the pair of left and right front wheels and the pair of left and right rear wheels. The front wheels and the rear wheels of the vehicle 1 may all be steerable steered wheels, or the front wheels or the rear wheels may be steerable steered wheels.

The vehicle 1 includes a sensor group 10, a navigation device 20, a control device 30 that is an example of the vehicle control device of the present invention, an electric power steering (EPS) system 40, a driving force control system 50, a braking force control system 60, a communication unit 70, an operation input unit 80, and an alarm device 90.

The sensor group 10 includes an external sensor 11 that acquires information on the surrounding of the vehicle 1 (hereinafter also referred to as "peripheral information"), and a vehicle sensor 12 that acquires information on the vehicle 1 (hereinafter also referred to as "vehicle information"). Information (in other words, detection values) acquired by each sensor in the sensor group 10 is output to the control device 30, and is used for control of the vehicle 1 (hereinafter, also referred to as "vehicle control") performed by the control device 30.

The external sensor 11 includes, for example, a camera 111, a sonar 112, and a radar 113. The camera 111 is an imaging device that images the surroundings of the vehicle 1 including the front of the vehicle 1 and outputs image data of an obtained peripheral image to the control device 30. As the camera 111, for example, a digital camera using an imaging element such as a charge coupled device (CCD) or a complementary metal oxide semiconductor (CMOS) can be adopted.

The sonar 112 emits sound waves to the surrounding of the vehicle 1 (for example, the front, the rear, and lateral sides of the vehicle 1), and receives reflected sounds from an object present around the vehicle 1, thereby detecting a distance to the object, an azimuth of the object, and the like. The radar 113 emits radio waves to the surrounding of the vehicle 1 including the front of the vehicle 1, and receives reflected waves from an object present around the vehicle 1, thereby detecting a distance to the object, an azimuth of the object, and the like. As the radar 113, for example, a millimeter wave radar can be adopted.

The external sensor 11 may include light detection and ranging (LiDAR) instead of or in addition to the sonar 112 and the radar 113. In this case, the LiDAR emits laser light around the vehicle 1 including the front of the vehicle 1, and receives reflected light from an object present around the vehicle 1, thereby detecting a distance to the object, a direction of the object, and the like.

The vehicle sensor 12 includes, for example, a wheel sensor 121, a vehicle speed sensor 122, an inertial measurement unit (IMU) 123, an occupant camera 124, an operation detection unit 125, and a steering touch sensor 126.

The wheel sensor 121 detects a rotation angle of one or more wheels among the wheels of the vehicle 1. As an example, the wheel sensor 121 detects rotation angles of a left rear wheel and a right rear wheel. As the wheel sensor 121, for example, an angle sensor or a displacement sensor can be adopted.

The vehicle speed sensor 122 detects a vehicle speed VP that is a travel speed of the vehicle 1 (in other words, a movement speed of a vehicle body). For example, the vehicle speed sensor 122 detects the vehicle speed VP based on a rotation speed of a counter shaft (not illustrated) provided in the vehicle 1.

The inertial measurement unit 123 detects angular velocities of the vehicle 1 in a pitch direction, a roll direction, and a yaw direction, and accelerations of the vehicle 1 in a front-rear direction, a left-right direction, and an upper-lower direction. The vehicle sensor 12 may include, instead of the inertial measurement unit 123, an acceleration sensor that detects an acceleration of the vehicle 1 in a predetermined direction and a gyro sensor that detects an angular velocity of the vehicle 1 in a predetermined direction.

The occupant camera 124 is a digital camera that images the interior of the vehicle 1 and outputs image data of the obtained interior image to the control device 30. For example, the occupant camera 124 may be a so-called "driver monitor camera" that is capable of imaging the head of an occupant who sits on the driver's seat of the vehicle 1 (hereinafter, also referred to as a "driver") from the front (in other words, imaging the face). Similarly to the camera 111, a digital camera using an imaging element such as a CCD or a CMOS can be employed as the occupant camera 124.

The operation detection unit 125 detects an operation performed by using the operation input unit 80 that is operable by the driver. In the present embodiment, the operation input unit 80 can include, for example, an operation button (not illustrated) for receiving an operation to switch between on (in other words, operation) and off (in other words, non-operation) of predetermined driving assist control. In this case, the operation detection unit 125 can detect an operation of turning on or off the predetermined driving assist control.

The steering touch sensor 126 detects whether a steering 46 of the vehicle 1 is gripped appropriately. For example, the steering touch sensor 126 is implemented by a capacitance sensor or the like. In this case, the capacitance sensor is provided at a portion touched by the driver when the steering 46 is gripped appropriately.

The navigation device 20 includes, for example, a global navigation satellite system (GNSS) receiver 21, a touch panel 22, and a speaker 23. The navigation device 20 includes a storage unit (not illustrated) implemented by a flash memory or the like. The storage unit of the navigation device 20 stores a map information database (DB) 24 as an example of map information and the like.

The map information database 24 includes road network information. The road network information is information representing roads based on a combination of nodes and links connecting the nodes (also referred to as "paths"). Each node in the road network information represents, for example, a feature point on a road such as an intersection, a corner, or a dead end. In the road network information, each node is set with, for example, information indicating a location corresponding to the node (for example, coordinates that enable the identification of one point on a map such as latitude and longitude). In addition, in the road network information, each link is set with information indicating nodes at both ends of the link, a road corresponding to the link, a link length, a lane number (number of lane(s)), a traveling direction, a road type, and the like.

The GNSS receiver 21 identifies a current position of the vehicle 1 (for example, a latitude and a longitude of a location where the vehicle 1 is located) based on a signals received from a GNSS satellite. For example, the navigation device 20 may acquire a detection result of the vehicle sensor 12 (for example, the wheel sensor 121 or the vehicle speed sensor 122) via the control device 30, and identify or complement the current position of the vehicle 1 by an inertial navigation system (INS) using a detection value of the vehicle sensor 12.

The touch panel 22 is implemented by combining a display device such as a liquid crystal display or an organic light emitting diode (OLED) with a pointing device (for example, touch pad). The speaker 23 is configured to output sound to an occupant (for example, a driver) of the vehicle 1.

For example, the navigation device 20 searches for a route from a current position of the vehicle 1 to a destination set by the driver using the touch panel 22 by referring to the map information database 24. Then, the navigation device 20 performs route guidance using the touch panel 22 and the speaker 23 based on the route searched for. The navigation device 20 may cause the touch panel 22 to perform a predetermined display according to an instruction from the control device 30. Further, the navigation device 20 may output, to the control device 30, information indicating the identified current position of the vehicle 1 or predetermined information (for example, information indicating an operation received via the touch panel 22).

In the present embodiment, the control device 30 is configured to refer to the map information database 24 (that is, map information) of the navigation device 20. However, the present invention is not limited thereto. Map information including road network information similar to that of the map information database 24 may be separately stored in the control device 30 or the like, and the control device 30 may refer to such map information.

The control device 30 is a computer that includes, for example, a processor configured to perform various calculations, a storage unit having a non-transitory storage medium (for example, a flash memory) for storing various types of information, and an input and output unit configured to control input and output of data between the inside and the outside of the control device 30 (none illustrated), and executes overall control of the vehicle 1. For example, the control device 30 is implemented by one electronic control unit (ECU) or by a plurality of ECUs working in cooperation with each other. Since specific examples of control executed by the control device 30 will be described later, the description thereof will be omitted here.

The EPS system 40 includes a steering angle sensor 41, a torque sensor 42, an EPS motor 43, a resolver 44, and an EPS ECU 45.

The steering angle sensor 41 detects a steering angle $\theta st$ of the steering wheel 46 and outputs information indicating the detected steering angle $\theta st$ to the EPS ECU 45. The torque sensor 42 detects a steering torque TQ, which is a torque applied to the steering wheel 46 of the vehicle 1, and outputs information indicating the detected steering torque TQ to the EPS ECU 45.

The EPS motor 43 assists the driver in operating the steering wheel 46 by applying, according to an instruction from the EPS ECU 45, a driving force or a reaction force to a steering column 47 connected to the steering wheel 46. The resolver 44 detects a rotation angle $\theta m$ of the EPS motor 43 and outputs information indicating the detected rotation angle $\theta m$ to the EPS ECU 45.

The EPS ECU 45 is a computer that includes, for example, a processor configured to perform various calculations, a storage unit having a non-transitory storage medium for storing various types of information, and an input and output unit configured to control input and output of data between the inside and the outside of the EPS ECU 45 (none illustrated), and controls the EPS system 40 (for example, the EPS motor 43). The EPS ECU 45 is implemented by one or two or more ECUs. For example, the EPS ECU 45 controls the EPS system 40 (for example, the EPS motor 43) based on the steering angle $\theta st$ detected by the steering angle sensor 41, the steering torque TQ detected by the torque sensor 42, the rotation angle $\theta m$ detected by the resolver 44, and the like.

The EPS system 40 (for example, the EPS ECU 45) may output, to the control device 30, information indicating the steering angle $\theta st$ detected by the steering angle sensor 41, the steering torque TQ detected by the torque sensor 42, the rotation angle $\theta m$ detected by the resolver 44, and the like. Further, the EPS system 40 (for example, the EPS ECU 45) may output information indicating a steering speed $\omega$ of the steering wheel 46 to the control device 30. In this case, the steering speed $\omega$ is obtained by, for example, differentiating the steering angle $\theta st$ with respect to time.

The driving force control system 50 includes a drive ECU 51, and is configured to control a driving force of the vehicle 1. The drive ECU 51 is a computer that includes, for example, a processor configured to perform various calculations, a storage unit having a non-transitory storage medium for storing various types of information, and an input and output unit configured to control input and output of data between the inside and the outside of the drive ECU 51 (none illustrated), and controls the driving force control system 50. The drive ECU 51 is implemented by one or more ECUs. For example, based on an operation on an accelerator pedal 52 provided in the vehicle 1, the drive ECU 51 controls the power output from the drive source of the vehicle 1. The drive ECU 51 can also control the driving force control system 50 (for example, a drive source) according to an instruction from the control device 30.

The braking force control system 60 includes a braking ECU 61, and is configured to control a braking force of the vehicle 1. The braking ECU 61 is a computer that includes, for example, a processor configured to perform various calculations, a storage unit having a non-transitory storage medium for storing various types of information, and an input and output unit configured to control input and output of data between the inside and the outside of the braking ECU 61 (none illustrated), and controls the braking force control system 60. The braking ECU 61 is implemented by one or more ECUs. For example, the braking ECU 61 controls the braking force of the vehicle 1 by controlling a brake device (not illustrated) provided in the vehicle 1 based on an operation on a brake pedal 62 provided in the vehicle 1. Here, the brake device includes, for example, a brake caliper, a cylinder that transmits a hydraulic pressure to the brake caliper, and an electric motor that generates a hydraulic pressure in the cylinder. The braking ECU 61 controls the electric motor of the brake device such that a braking force corresponding to the operation on the brake pedal 62 is generated. The braking ECU 61 can also control the braking force control system 60 (for example, a brake device) according to an instruction from the control device 30.

The communication unit 70 is a communication interface that communicates with an external device 2 under control executed by the control device 30. That is, the control device 30 may communicate with the external device 2 via the communication unit 70. Examples of the external device 2 can include a terminal device (for example, a smartphone) of the driver and a server device managed by a manufacturer of the vehicle 1. For example, a mobile communication network such as a cellular line, WI-FI (registered trademark), or Bluetooth (registered trademark) can be adopted for communication between the vehicle 1 and the external device 2.

The alarm device 90 is a device that alarms the driver according to the control of the control device 30. The alarm device 90 includes, for example, a multi-information display (MID) 91 and a buzzer 92.

The MID 91 is implemented by a display device such as a liquid crystal display or an OLED, and is provided at a position that the driver can visually recognize (for example, in a meter panel of the vehicle 1). For example, the MID 91 displays a predetermined alarm image in accordance with an instruction from the control device 30. The MID 91 may be integrated with the touch panel 22 described above. That is, the "MID 91" in the following description may be interpreted as the "touch panel 22".

The buzzer 92 is configured to output a predetermined alarm sound. For example, the buzzer 92 outputs a predetermined alarm sound in accordance with an instruction from the control device 30. The buzzer 92 may be integrated with the speaker 23 described above. That is, the "buzzer 92" in the following description may be interpreted as the "speaker 23".

[2. Control Device]

Next, the control device 30 will be described in more details. The control device 30 includes, for example, a recognition unit 31, a deviation calculation unit 32, a determination unit 34 and a vehicle control unit 35 as functional units implemented by the processor executing a program stored in the storage unit of the control device 30.

The recognition unit 31 recognizes a surrounding situation of the vehicle 1. For example, the recognition unit 31 performs sensor fusion processing on detection results obtained by some or all of the camera 111, the sonar 112, and the radar 113 in the external sensor 11, and recognizes the surrounding situation of the vehicle 1 based on a processing result.

The recognition unit 31 recognizes a position, a type, a speed, an acceleration, and the like of an object present around the vehicle 1 as the surrounding situation of the vehicle 1. At this time, the recognition unit 31 recognizes the position of the object as a position on absolute coordinates in which a representative point (for example, a center of gravity and a center of a drive shaft) of the vehicle 1 is set as an origin. Accordingly, a relative position between the vehicle 1 and the object present around can be recognized. In the absolute coordinate system, the position of the object may be represented using a representative point such as a center of gravity or a corner of the object, or may be represented as an area.

Examples of objects that can be recognized by the first recognition unit 31 include traffic participants such as other vehicles and pedestrians, division lines, curbs and separation zones that define lanes, and road structures such as guard rails and road shoulders. The first recognition unit 31 may recognize, for example, other road events such as a traffic light, a stop line, a crosswalk, a road sign, a branch, a junction, an interchange, and a tollbooth of a toll road. As an example, the recognition unit 31 recognizes a traffic light present around the vehicle 1 based on recognition of any one or more lighting parts among a plurality of lighting parts included in a general traffic light (for example, lighting parts 611 to 613 described later) from a peripheral image or the like captured by the camera 111.

According to such a recognition unit 31, for example, in addition to the shape of the host lane which is the lane on which the vehicle 1 travels, it is possible to recognize a traffic light, traffic participants (for example, other vehicles), and the like present around the vehicle 1.

In the following description, a road having the host lane, that is, a road on which the vehicle 1 travels is also referred to as a "travel path Rd1". Here, the travel path Rd1 may include another lane whose traveling direction is the same as that of the host lane, but does not include another lane whose traveling direction is opposite to the host lane (hereinafter, also referred to as an "oncoming lane"). In the following description, a road having an oncoming lane, that is, a road having a traveling direction opposite to the travel path Rd1 is also referred to as an "oncoming road Rd2". Normally, the travel path Rd1 and the oncoming road Rd2 are often in parallel with each other.

If a traffic light present around the vehicle 1 is recognized, the recognition unit 31 may identify a location corresponding to the traffic light (for example, the latitude and longitude of the location where the traffic light is located). For example, in this case, the recognition unit 31 may identify the location corresponding to the traffic light in reference to the map information such as the map information database 24 based on the recognized relative position between the traffic light and the vehicle 1 and the current position of the vehicle 1 identified by the navigation device 20 (for example, the GNSS receiver 21).

If a traffic light is recognized by the recognition unit 31, the deviation calculation unit 32 calculates the deviation of the traffic light relative to the travel path Rd1. Although detailed description will be omitted here because details will be described later, the deviation calculation unit 32 calculates, for example, a distance between the location corresponding to the traffic light recognized by the recognition unit 31 and a traveling lane boundary of the travel path Rd1 as the deviation of the traffic light relative to the travel path Rd1. Accordingly, it is possible to calculate an appropriate value as the deviation of the traffic light relative to the travel path Rd1.

The determination unit 34 determines whether the traffic light recognized by the recognition unit 31 is a traffic light corresponding to the travel path Rd1 based on the deviation calculated by the deviation calculation unit 32. Here, the traffic light corresponding to the travel path Rd1 is, for example, a traffic light for performing instructions such as "allow passage (for example, green light)" or "stop (for example, red light)" to the vehicle 1 or the like traveling on the travel path Rd1.

In the present embodiment, in order for the determination unit 34 to more accurately determine whether the recognized traffic light is a traffic light corresponding to the travel path Rd1, the control device 30 further includes, for example, an evaluation value derivation unit 33 as a functional unit implemented with the processor executing a program stored in the storage unit of the control device 30.

The evaluation value derivation unit 33 derives a first evaluation value indicating a degree of association between the traffic light recognized by the recognition unit 31 and the travel path Rd1 based on the deviation calculated by the deviation calculation unit 32. The first evaluation value indicates a higher degree of association between the traffic light recognized by the recognition unit 31 and the travel path Rd1 as the first evaluation value is larger, and, as will be described later, takes a maximum value if the deviation is "0", for example.

As described above, if the control device 30 includes the evaluation value derivation unit 33, the determination unit 34 determines whether the recognized traffic light is a traffic light corresponding to the travel path Rd1 based on the first evaluation value derived by the evaluation value derivation unit 33. For example, the determination unit 34 may determine that the recognized traffic light is a traffic light corresponding to the travel path Rd1 if the first evaluation value derived by the evaluation value derivation unit 33 is equal to or greater than a threshold, and may determine that the recognized traffic light is not a traffic light corresponding to the travel path Rd1 if the first evaluation value is less than the threshold.

In this way, by determining whether the traffic light corresponds to the travel path Rd1 based on the first evaluation value derived by the evaluation value derivation unit 33, it is possible to determine whether the traffic light corresponds to the travel path Rd1 more accurately than a case where it is simply determined whether the traffic light corresponds to the travel path Rd1 based on the deviation calculated by the deviation calculation unit 32.

The evaluation value derivation unit 33 is not an essential configuration and may not be provided. In such a case, for example, the determination unit 34 may determine that the recognized traffic light is a traffic light corresponding to the travel path Rd1 if the deviation calculated by the deviation calculation unit 32 is less than a threshold, and may determine that the recognized traffic light is not a traffic light corresponding to the travel path Rd1 if the deviation is equal to or greater than the threshold.

The vehicle control unit 35 controls the vehicle 1 based on the determination result of the determination unit 34. The vehicle control unit 35 reflects the determination result of the determination unit 34 in the vehicle control, and the vehicle control is not particularly limited. For example, if the determination unit 34 determines that the recognized traffic light is a traffic light corresponding to the travel path Rd1 and the traffic light instructs "stop", the vehicle control unit 35 may control the vehicle 1 such that the vehicle 1 stops before a predetermined stop line on the travel path Rd1. In addition, if the determination unit 34 determines that the recognized traffic light is a traffic light corresponding to the travel path Rd1 and the traffic light instructs "stop", the vehicle control unit 35 may issue an alarm for calling the driver's attention via the alarm device 90 if the vehicle 1 does not decelerate while the distance from the vehicle 1 to the traffic light is equal to or less than a predetermined value.

[3. Example of Processing Implemented with Functional Units of Control Device]

Figure 2:
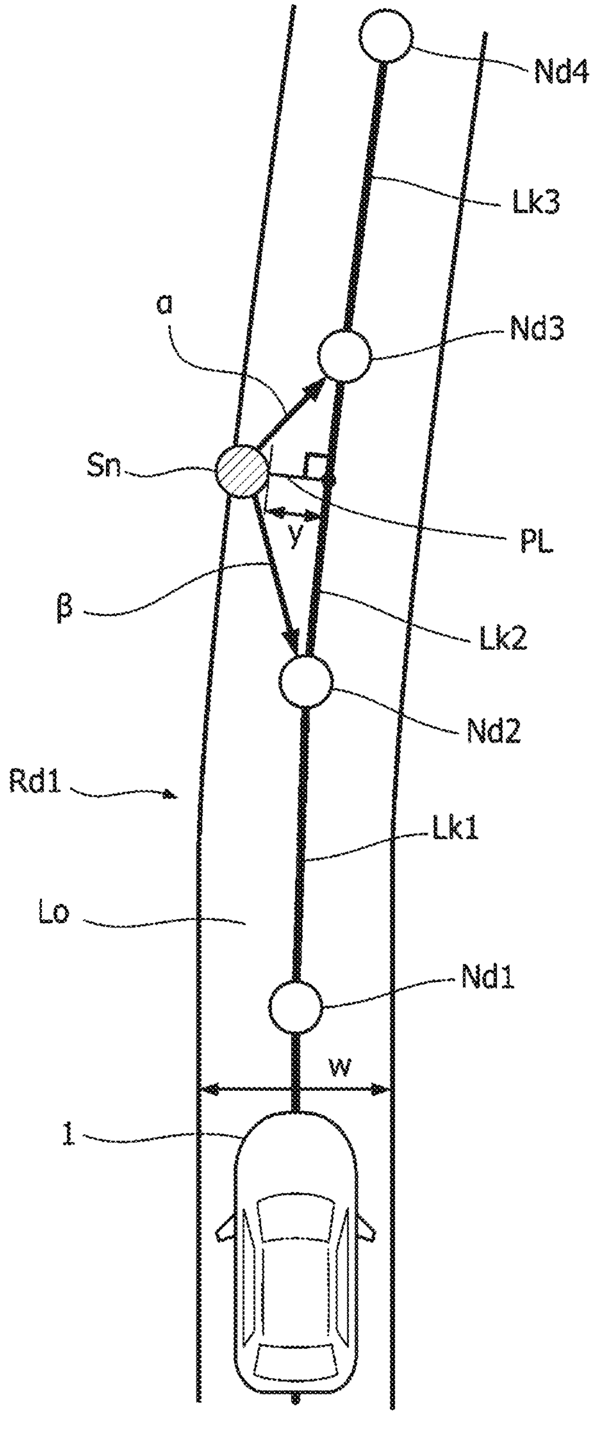
FIG. 2 is a diagram illustrating a first example of processing implemented with functional units of the control device 30.

Hereinafter, an example of processing implemented with the functional units of the control device 30 will be described. FIG. 2 is a diagram illustrating a first example of processing implemented with the functional units of the control device 30.

In the example illustrated in FIG. 2, the vehicle 1 is traveling on the travel path Rd1 from the lower side to the upper side in FIG. 2. The travel path Rd1 in this example is a one-lane road including only a host lane Lo, which is a lane on which the vehicle 1 travels.

A node Nd1, a node Nd2, a node Nd3, and a node Nd4 are nodes corresponding to the travel path Rd1 of the present example in the map information such as the map information database 24. A link Lk1, a link Lk2, and a link Lk3 are links corresponding to the travel path Rd1 of the present example in the map information such as the map information database 24. In this example, the link Lk1 is a link connecting the node Nd1 and the node Nd2, the link Lk2 is a link connecting the node Nd2 and the node Nd3, and the link Lk3 is a link connecting the node Nd3 and the node Nd4.

As illustrated in FIG. 2, if the vehicle 1 is traveling on the travel path Rd1, the recognition unit 31 recognizes, for example, a division line dividing one side in the width direction (for example, the left side of the vehicle 1) of the host lane Lo and a division line dividing the other side in the width direction (for example, the right side of the vehicle 1) of the host lane Lo, and recognizes the shape of the host lane Lo including a host lane width w, which is the length in the width direction of the host lane Lo, based on the recognition results.

If the traffic light Sn is present in front of the vehicle 1 traveling on the travel path Rd1, the recognition unit 31 recognizes the traffic light Sn and identifies a location corresponding to the traffic light Sn. In FIG. 2, a circle denoted by the reference sign Sn represents the location corresponding to the traffic light Sn.

If the traffic light Sn is recognized by the recognition unit 31, the deviation calculation unit 32 calculates the deviation of the traffic light Sn relative to the travel path Rd1. In the calculation of the deviation of the traffic light Sn relative to the travel path Rd1, for example, the deviation calculation unit 32 first calculates, as the traffic light offset amount for the traffic light Sn, a length of a perpendicular line PL drawn from the location corresponding to the traffic light Sn to a link connecting a node closest to the traffic light Sn and a node second closest to the traffic light Sn (in other words, a line segment passing through the node closest to the traffic light Sn and the node second closest to the traffic light Sn) among the nodes of the travel path Rd1.

In this example, as illustrated in FIG. 2, the node closest to the traffic light Sn is the node Nd3 (see the arrow denoted by the reference sign $\alpha$ in FIG. 2), and the second closest node is the node Nd2 (see the arrow denoted by the reference sign $\beta$ in FIG. 2). Therefore, the deviation calculation unit 32 calculates, as the traffic light offset amount for the traffic light Sn, a length "y" of the perpendicular line PL drawn from the location corresponding to the traffic light Sn to the link Lk2 connecting the node Nd2 and the node Nd3. Here, "y", which is the traffic light offset amount for the traffic light Sn, can also be said to be the minimum distance from the link Lk2 connecting the node Nd3 closest to the traffic light Sn and the node Nd2 second closest to the traffic light Sn among the nodes of the travel path Rd1 to the location corresponding to the traffic light Sn.

Next, the deviation calculation unit 32 calculates the deviation of the traffic light Sn relative to the travel path Rd1 based on the traffic light offset amount calculated in this way and the boundary distance of the travel path Rd1. Hereinafter, the boundary distance and the deviation will be described in more detail. In the following description, the same portions as those in the example described above will be appropriately omitted or simplified.

Figure 3:
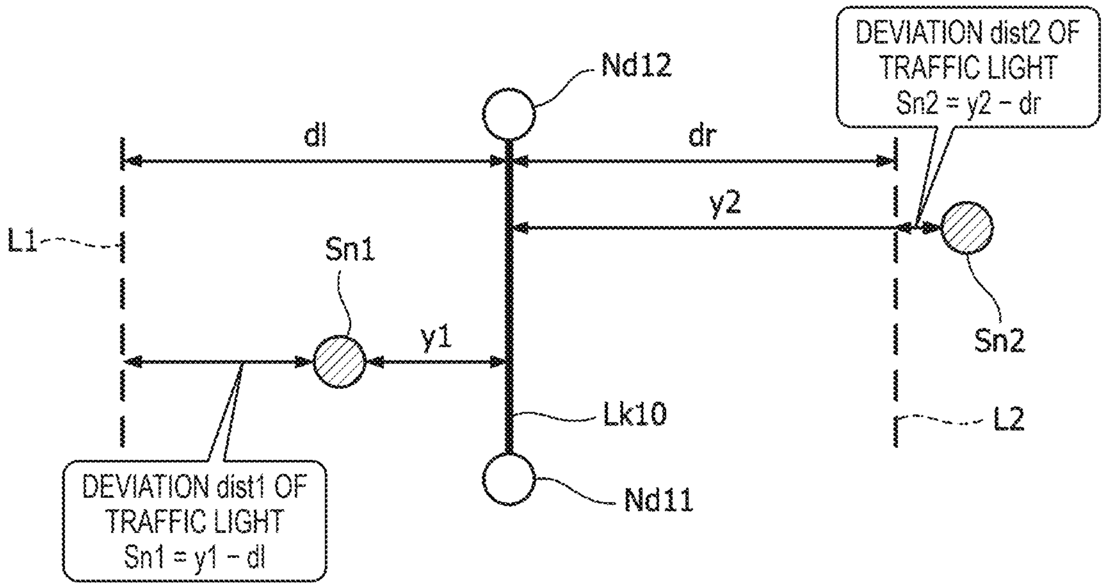
FIG. 3 is a diagram illustrating a second example of processing implemented with the functional units of the control device 30.

FIG. 3 is a diagram illustrating a second example of processing implemented with the functional units of the control device 30. The example illustrated in FIG. 3 assumes that a traffic light Sn1 and a traffic light Sn2 are present in front of the vehicle 1 traveling on the travel path Rd1, and that the traffic light Sn1 and the traffic light Sn2 are recognized by the recognition unit 31. Further, in this example, a node closest to each of the traffic light Sn1 and the traffic light Sn2 is a node Nd11, a node second closest to each of the traffic light Sn1 and the traffic light Sn2 is a node Nd12, and a link connecting the node Nd11 and the node Nd12 is a link Lk10.

In the present example, in the calculation of the deviation of the traffic light Sn1 relative to the travel path Rd1, for example, the deviation calculation unit 32 first calculates, as the traffic light offset amount for the traffic light Sn1, a length "y1" of a perpendicular line PL (not illustrated) drawn from a location corresponding to the traffic light Sn1 to the link Lk10. Here, "y1", which is the traffic light offset amount for the traffic light Sn1, can also be said to be the minimum distance from the link Lk10 connecting the node Nd11 closest to the traffic light Sn1 and the node Nd12 second closest to the traffic light Sn1 to the location corresponding to the traffic light Sn1.

Next, the deviation calculation unit 32 sets a line offset from the link Lk10 connecting the node Nd11 closest to the traffic light Sn1 and the node Nd12 second closest to the traffic light Sn1 by a predetermined first boundary distance dl to the left side, which is one side in the width direction of the travel path Rd1, as a left traveling lane boundary L1 of the travel path Rd1. In addition, the deviation calculation unit 32 sets a line offset from the link Lk10 connecting the node Nd11 closest to the traffic light Sn1 and the node Nd12 second closest to the traffic light Sn1 by a predetermined second boundary distance dr to the right side, which is the other side in the width direction of the travel path Rd1, as a right traveling lane boundary L2 of the travel path Rd1.

Then, the deviation calculation unit 32 calculates, as a deviation dist1 of the traffic light Sn1, a difference between the traffic light offset amount for the traffic light Sn1 (in other words, the minimum distance from the link Lk10 to the location corresponding to the traffic light Sn1) and the boundary distance corresponding to the traveling lane boundary closer to the location corresponding to the traffic light Sn1 between the left traveling lane boundary L1 and the right traveling lane boundary L2. Specifically, in the case of the present example, since the traveling lane boundary closer to the location corresponding to the traffic light Sn1 between the left traveling lane boundary L1 and the right traveling lane boundary L2 is the left traveling lane boundary L1, the deviation calculation unit 32 calculates, as the deviation dist1 of the traffic light Sn1, a value obtained by subtracting the first boundary distance dl, which is the boundary distance corresponding to the left traveling lane boundary L1, from "y1", which is the traffic light offset amount for the traffic light Sn1.

Therefore, if the location corresponding to the traffic light Sn1 is located closer to the link Lk10 than is the left traveling lane boundary L1 as illustrated in FIG. 3, the deviation dist1 of the traffic light Sn1 takes a negative value. On the other hand, if the location corresponding to the traffic light Sn1 is farther from the link Lk10 beyond the left traveling lane boundary L1, the deviation dist1 of the traffic light Sn1 takes a positive value. That is, the deviation dist1 of the traffic light Sn1 takes a larger value as the location corresponding to the traffic light Sn1 is farther from the link Lk10 beyond the left traveling lane boundary L1.

In the present example, in the calculation of the deviation of the traffic light Sn2 relative to the travel path Rd1, for example, the deviation calculation unit 32 first calculates, as the traffic light offset amount for the traffic light Sn2, a length "y2" of a perpendicular line PL (not illustrated) drawn from a location corresponding to the traffic light Sn2 to the link Lk10. Here, "y2", which is the traffic light offset amount for the traffic light Sn2, can also be said to be the minimum distance from the link Lk10 connecting the node Nd11 closest to the traffic light Sn2 and the node Nd12 second closest to the traffic light Sn2 to the location corresponding to the traffic light Sn2.

Next, the deviation calculation unit 32 sets a line offset from the link Lk10 connecting the node Nd11 closest to the traffic light Sn2 and the node Nd12 second closest to the traffic light Sn2 by the first boundary distance dl to the left side of the travel path Rd1 as the left traveling lane boundary L1 of the travel path Rd1. In addition, the deviation calculation unit 32 sets a line offset from the link Lk10 connecting the node Nd11 closest to the traffic light Sn2 and the node Nd12 second closest to the traffic light Sn2 by the second boundary distance dr to the right side of the travel path Rd1 as the right traveling lane boundary L2 of the travel path Rd1.

Then, the deviation calculation unit 32 calculates, as a deviation dist2 of the traffic light Sn2, a difference between the traffic light offset amount for the traffic light Sn2 (in other words, the minimum distance from the link Lk10 to the location corresponding to the traffic light Sn2) and the boundary distance corresponding to the traveling lane boundary closer to the location corresponding to the traffic light Sn2 between the left traveling lane boundary L1 and the right traveling lane boundary L2. Specifically, in the case of the present example, since the traveling lane boundary closer to the location corresponding to the traffic light Sn2 between the left traveling lane boundary L1 and the right traveling lane boundary L2 is the right traveling lane boundary L2, the deviation calculation unit 32 calculates, as the deviation dist2 of the traffic light Sn2, a value obtained by subtracting the second boundary distance dr, which is the boundary distance corresponding to the right traveling lane boundary L2, from "y2", which is the traffic light offset amount for the traffic light Sn2.

Therefore, if the location corresponding to the traffic light Sn2 is located closer to the link Lk10 than is the right traveling lane boundary L2 as illustrated in FIG. 3, the deviation dist2 of the traffic light Sn2 takes a negative value. On the other hand, if the location corresponding to the traffic light Sn2 is farther from the link Lk10 beyond the right traveling lane boundary L2, the deviation dist2 of the traffic light Sn2 takes a positive value. That is, the deviation dist2 of the traffic light Sn2 takes a larger value as the location corresponding to the traffic light Sn2 is farther from the link Lk10 beyond the right traveling lane boundary L2.

The deviation calculation unit 32 sets the first boundary distance dl and the second boundary distance dr described above, for example, based on the host lane width w (that is, the length of the host lane Lo in the width direction) recognized by the recognition unit 31 and the lane number of the travel path Rd1 (number of lane(s) included in the travel path Rd1) indicated by the map information such as the map information database 24. As an example, the deviation calculation unit 32 a value obtained by an expression of (lane number n1 of travel path Rd1×host lane width w)/2 as the first boundary distance dl and the second boundary distance dr. Here, the lane number n1 of the travel path Rd1 can be, for example, the lane number set for the link used for calculating the deviation (the link Lk10 in the above example). That is, the deviation calculation unit 32 sets the first boundary distance dl and the second boundary distance dr based on the host lane width w recognized by the recognition unit 31 and the lane number n1 of the travel path Rd1 indicated by the map information such as the map information database 24.

In this way, by setting the first boundary distance dl and the second boundary distance dr based on the host lane width w and the lane number n1 of the travel path Rd1 in the map information such as the map information database 24, even if the recognition unit 31 cannot recognize the entire travel path Rd1 in the width direction, it is possible to set the appropriate first boundary distance dl and second boundary distance dr. In addition, even if no information indicating the first boundary distance dl and the second boundary distance dr is included in the map information such as the map information database 24, it is possible to set an appropriate first boundary distance dl and an appropriate second boundary distance dr.

For example, if the recognition unit 31 can recognize the entire travel path Rd1 in the width direction, the deviation calculation unit 32 may set the first boundary distance dl and the second boundary distance dr based on the recognition result of the recognition unit 31. If the information indicating the first boundary distance dl and the second boundary distance dr is included in the map information such as the map information database 24, the deviation calculation unit 32 may set the first boundary distance dl and the second boundary distance dr based on the map information.

Incidentally, even if the traffic light Sn corresponds to the travel path Rd1, the traffic light Sn may be provided closer to the oncoming road Rd2 (for example, on the oncoming road Rd2) whose traveling direction is opposite to the travel path Rd1. Therefore, even if provided closer to the oncoming road Rd2, a traffic light Sn corresponding to the travel path Rd1 is desired to be determined as a traffic light corresponding to the travel path Rd1. Therefore, the control device 30 may perform, for example, the following processing.

Figure 4:
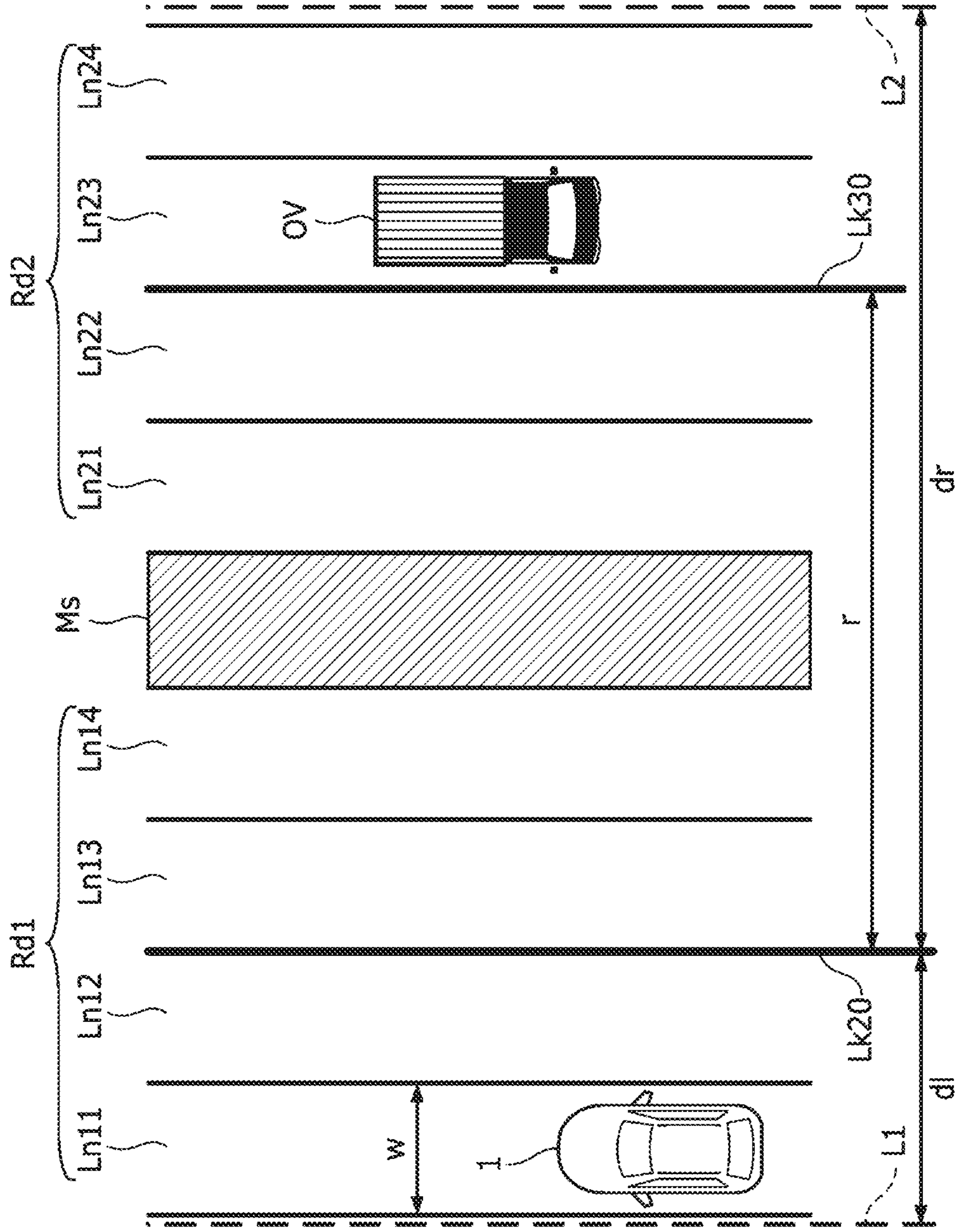
FIG. 4 is a diagram illustrating a third example of processing implemented with the functional units of the control device 30.

FIG. 4 is a diagram illustrating a third example of processing implemented with the functional units of the control device 30. In the example illustrated in FIG. 4, the travel path Rd1 on which the vehicle 1 travels is a four-lane road including a first lane Ln11 as the host lane Lo on which the vehicle 1 travels, a second lane Ln12, a third lane Ln13, and a fourth lane Ln14.

In this example, the oncoming road Rd2 in parallel with the travel path Rd1 is present. Similarly to the travel path Rd1, the oncoming road Rd2 is a four-lane road including a first lane Ln21, a second lane Ln22, a third lane Ln23, and a fourth lane Ln24. Another vehicle OV traveling in a direction opposite to the vehicle 1 is present in the third lane Ln23 of the oncoming road Rd2. A median strip Ms is present between the travel path Rd1 and the oncoming road Rd2.

If the value obtained by the expression of (lane number n1 of travel path Rd1×host lane width w)/2 described above is set as the first boundary distance dl and the second boundary distance dr, a large value is calculated as the deviation if the traffic light Sn corresponding to the travel path Rd1 is provided closer to the oncoming road Rd2, which makes it difficult to determine the traffic light Sn as the traffic light corresponding to the travel path Rd1.

Therefore, if the oncoming road Rd2 whose traveling direction is opposite to the travel path Rd1 is present around the vehicle 1, the deviation calculation unit 32 may set the boundary distance corresponding to the traveling lane boundary closer to the oncoming road Rd2 between the left traveling lane boundary L1, which is the traveling lane boundary on one side in the width direction of the travel path Rd1, and the right traveling lane boundary L2, which is the traveling lane boundary on the other side in the width direction of the travel path Rd1, larger than that of the case where the oncoming road Rd2 is not present. In this way, even if the traffic light Sn corresponding to the travel path Rd1 is provided closer to the oncoming road Rd2, it is possible to easily determine the traffic light Sn as a traffic light corresponding to the travel path Rd1.

Specifically, in the case of the present example, since the traveling lane boundary closer to the oncoming road Rd2 between the left traveling lane boundary L1 and the right traveling lane boundary L2 is the right traveling lane boundary L2, the deviation calculation unit 32 sets the second boundary distance dr, which is the boundary distance corresponding to the right traveling lane boundary L2, larger than that of the case where the oncoming road Rd2 is not present.

As an example, the deviation calculation unit 32 sets the value obtained by the expression of (lane number n1 of travel path Rd1×host lane width w)/2 described above for the first boundary distance dl corresponding to the left traveling lane boundary L1, which is the traveling lane boundary farther from the oncoming road Rd2.

On the other hand, the deviation calculation unit 32 sets, for example, a value obtained by an expression of r+(lane number n2 of oncoming road Rd2×host lane width w)/2 as the second boundary distance dr corresponding to the right traveling lane boundary L2 which is the traveling lane boundary closer to the oncoming road Rd2. Here, the lane number n2 of the oncoming road Rd2 can be the lane number set for the link Lk30 corresponding to the oncoming road Rd2. That is, the deviation calculation unit 32 increases the boundary distance corresponding to the traveling lane boundary closer to the oncoming road Rd2 based on the host lane width w recognized by the recognition unit 31 and the lane number n2 of the oncoming road Rd2 indicated by the map information such as the map information database 24.

Further, r is, for example, a distance between a link Lk20 corresponding to the travel path Rd1 and a link Lk30 corresponding to the oncoming road Rd2, and can be obtained as a distance between a line segment connecting nodes provided at both ends of the link Lk20 and a line segment connecting nodes provided at both ends of the link Lk30.

In this way, as illustrated in FIG. 4, the right traveling lane boundary L2 can be shifted to the side closer to the oncoming road Rd2. Accordingly, even if the traffic light Sn corresponding to the travel path Rd1 is provided closer to the oncoming road Rd2, it is possible to prevent a large value from being calculated as the deviation thereof, and to easily determine the traffic light Sn as a traffic light corresponding to the travel path Rd1.

Further, if the oncoming road Rd2 is present around the vehicle 1, the deviation calculation unit 32 increases the boundary distance corresponding to the traveling lane boundary closer to the oncoming road Rd2 based on the host lane width w recognized by the recognition unit 31 and the lane number n2 of the oncoming road Rd2 indicated by the map information such as the map information database 24. Thereby, even if the recognition unit 31 cannot recognize the oncoming road Rd2, it is possible to appropriately set the boundary distance corresponding to the traveling lane boundary closer to the oncoming road Rd2.

Figure 5:
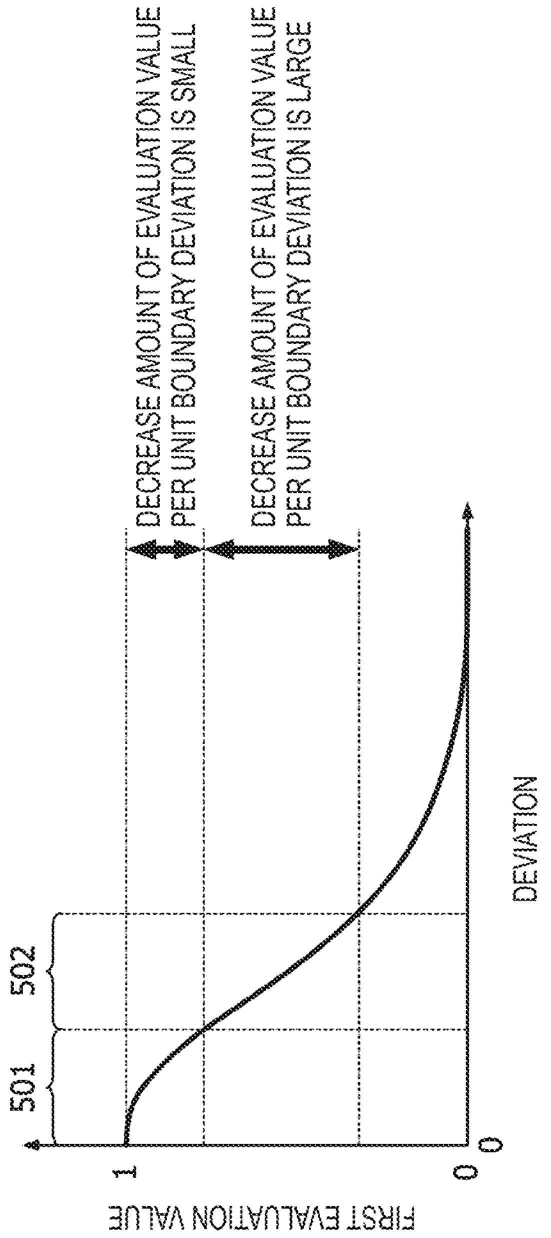
FIG. 5 illustrates an example of a first evaluation value derived by an evaluation value derivation unit 33.

Next, an example of the first evaluation value derived by the evaluation value derivation unit 33 will be described. FIG. 5 is a diagram illustrating an example of the first evaluation value derived by the evaluation value derivation unit 33. In FIG. 5, the vertical axis represents the magnitude of the first evaluation value, and the horizontal axis represents the magnitude of the deviation.

If the deviation calculated by the deviation calculation unit 32 is equal to or less than "0", the evaluation value derivation unit 33 derives the first evaluation value as "1", for example. Here, "1" is the maximum value of the first evaluation value. In FIG. 5, the first evaluation value when the deviation is in the negative area is not illustrated.

On the other hand, if the deviation calculated by the deviation calculation unit 32 does not take a negative value (in other words, takes a value of "0" or more), the evaluation value derivation unit 33 derives, for example, a value obtained by an equation of $1/\exp(\mathrm{DEV}\times \mathrm{dist}^2)$ as the first evaluation value. In this equation, dist is the deviation calculated by the deviation calculation unit 32. DEV is a standard deviation set in advance by the manufacturer of the vehicle 1.

According to the evaluation value derivation unit 33, as illustrated in FIG. 5, if the deviation calculated by the deviation calculation unit 32 is within a first range 501 close to "0", the decrease amount of the first evaluation value per unit deviation (for example, 1 [m]) can be reduced. Further, as illustrated in FIG. 5, if the deviation calculated by the deviation calculation unit 32 is within a second range 502 farther from "0" than the first range 501, the decrease amount of the first evaluation value per unit deviation can be increased.

Therefore, for example, even if the deviation calculated by the deviation calculation unit 32 varies within the first range 501 (that is, around "0") due to an error based on the recognition accuracy of the recognition unit 31 or the like, it is possible to derive a first evaluation value having a large value, which is likely to be determined as a traffic light corresponding to the travel path Rd1. Further, if the deviation is too large to fall within the first range 501, it is possible to derive a first evaluation value having a small value, which is unlikely to be determined as a traffic light corresponding to the travel path Rd1. That is, an appropriate value can be obtained as the first evaluation value regardless of whether the deviation is within the first range 501.

The traffic light Sn provided at an intersection between the travel path Rd1 and another road different from the travel path Rd1 may be recognized by the recognition unit 31. If the traffic light Sn provided at the intersection between the travel path Rd1 and the other road is recognized in this way, the deviation calculation unit 32 may calculate the deviation of the traffic light Sn relative to the other road in the same manner as the deviation of the traffic light Sn relative to the travel path Rd1. However, in this case, it should be noted that the link used for calculating the traffic light offset amount and the deviation needs to be a link corresponding to the other road instead of the link corresponding to the travel path Rd1. In this case, the evaluation value derivation unit 33 may derive the second evaluation value indicating the degree of association between the traffic light Sn and the other road based on the deviation of the traffic light Sn relative to the other road in the same manner as the first evaluation value.

In this case, if the first evaluation value is larger than the second evaluation value, the determination unit 34 may determine that the recognized traffic light Sn is a traffic light corresponding to the travel path Rd1. In this way, even if the traffic light Sn is provided at the intersection between the travel path Rd1 and another road, it is possible to accurately determine whether the traffic light Sn is a traffic light corresponding to the travel path Rd1.

Figure 6:
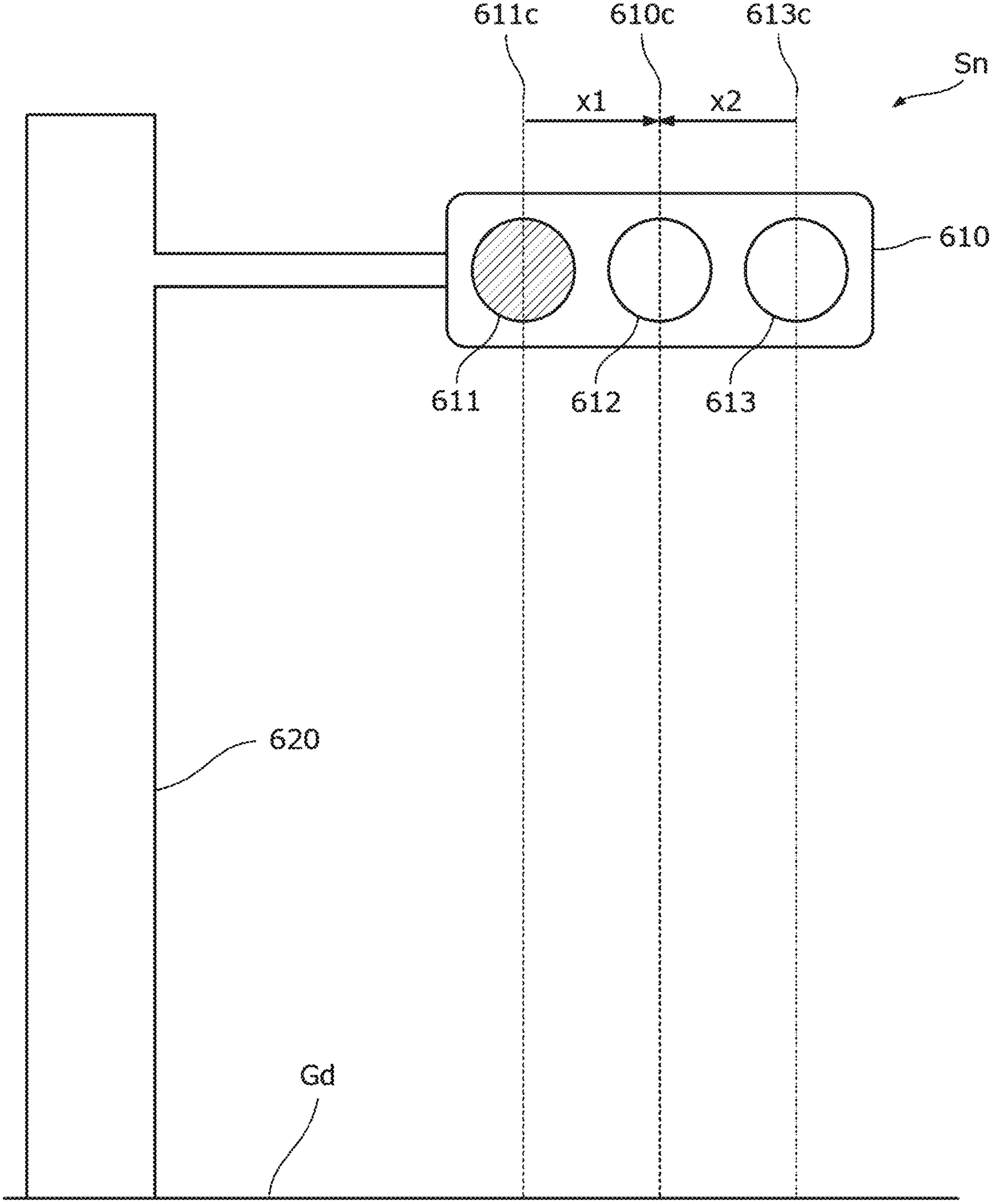
FIG. 6 illustrates an example of a traffic light Sn.

FIG. 6 is a diagram illustrating an example of the traffic light Sn. As illustrated in FIG. 6, the traffic light Sn may include a body 610 including a plurality of lighting parts 611 to 613 and a support 620 supporting the body 610.

The lighting part 611 is, for example, a portion in the traffic light Sn that lights (in other words, emits light) in a green lighting color corresponding to the instruction of "allow passage", and is provided on the left side of the central position 610*c* of the body 610. Here, the central position 610*c* of the body 610 is, for example, the center in the width direction of a housing for implementing the body 610.

In addition, the lighting part 612 is, for example, a portion in the traffic light Sn that lights in a yellow lighting color corresponding to an instruction of "stop if safe stop is possible", and overlaps the central position 610*c* of the body 610 when the traffic light Sn is viewed from the front. The lighting part 613 is, for example, a portion in the traffic light Sn that lights in a red lighting color corresponding to the instruction of "stop", and is provided on the right side of the central position 610*c* of the body 610.

The traffic light Sn can be configured by attaching light emitting devices (for example, LEDs) for implementing the lighting parts 611 to 613 the housing as the body 610, and supporting the body 610 by the support 620, which is implemented with a support column or the like extending in the vertical direction from the ground Gd.

The recognition unit 31 is capable of recognizing the traffic light Sn including the body 610 and the support 620. Further, the recognition unit 31 be capable of recognizing the body 610 separately from the support 620. If capable of recognizing the body 610 separately from the support 620, the recognition unit 31 may identify the location corresponding to the traffic light Sn based on the central position 610*c* of the body 610. As an example, the recognition unit 31 may identify the latitude and longitude of the location corresponding to the central position 610*c* of the body 610 as the location corresponding to the traffic light Sn. In this way, even if the traffic light Sn includes the support 620 that supports the body 610 (for example, if the support 620 is huge), it is possible to appropriately identify the location corresponding to the traffic light Sn.

Further, the recognition unit 31 may identify the location corresponding to the traffic light Sn based on the central position 610*c* of the body 610 if the body 610 is recognized, and may identify the location corresponding to the traffic light Sn based on the position and the color of the recognized lighting part if the body 610 is not recognized and only one or more among the plurality of lighting parts 611 to 613 are recognized.

As an example, it is assumed that the recognition unit 31 does not recognize the body unit 610 and recognizes only the lighting part 611 that lights in a green lighting color. In this case, the recognition unit 31 may identify a location corresponding to a position shifted to the right side by a predetermined distance x1 from the central position 611*c* of the lighting part 611 (for example, the center in the width direction of the lighting part 611) as the location corresponding to the traffic light Sn. Here, the predetermined distance x1 is determined in advance by the manufacturer of the vehicle 1 in consideration of, for example, a general interval between the central position 610*c* of the body 610 and the central position 611*c* of the lighting part 611.

As another example, it is assumed that the recognition unit 31 does not recognize the body unit 610 and recognizes only the lighting part 613 that lights in a red lighting color. In this case, the recognition unit 31 may identify a location corresponding to a position shifted to the left side by a predetermined distance x2 from the central position 613*c* of the lighting part 613 (for example, the center in the width direction of the lighting part 613) as the location corresponding to the traffic light Sn. Here, the predetermined distance x2 is determined in advance by the manufacturer of the vehicle 1 in consideration of, for example, a general interval between the central position 610*c* of the body 610 and the central position 613*c* of the lighting part 613.

As further another example, it is assumed that the recognition unit 31 does not recognize the body unit 610 and recognizes only the lighting part 612 that lights in a yellow lighting color. In this case, the recognition unit 31 may identify a location corresponding to the central position of the lighting part 612 (for example, the central position 610*c* of the body 610) as the location corresponding to the traffic light Sn.

As described above, the location corresponding to the traffic light Sn is identified based on the position and the color of the recognized lighting part if the body 610 is not recognized and only one or more among the plurality of lighting parts 611 to 613 are recognized. Thereby, even if the body 610 of the traffic light Sn is not recognized by the recognition unit 31, it is possible to appropriately identify the location corresponding to the traffic light Sn.

The recognition unit 31 may correct the location corresponding to the traffic light Sn based on the lane position of the host lane Lo on the travel path Rd1. In this case, the deviation calculation unit 32 calculates the deviation or the like using the location corresponding to the corrected traffic light Sn.

As an example, it is assumed that the travel path Rd1 is a three-lane road and a left lane located on the leftmost side among the three lanes is the host lane Lo. In this case, the recognition unit 31 may set a location shifted by a predetermined distance (for example, 3 [m]) to the right side from the location corresponding to the traffic light Sn identified as described above as the location corresponding to the corrected traffic light Sn.

As another example, it is assumed that the travel path Rd1 is a three-lane road and a right lane located on the rightmost side among the three lanes is the host lane Lo. In this case, the recognition unit 31 may set a location shifted by a predetermined distance (for example, 3 [m]) to the left side from the location corresponding to the traffic light Sn identified as described above as the location corresponding to the corrected traffic light Sn.

As further another example, it is assumed that the travel path Rd1 is a three-lane road and a center lane located between the left lane and the right lane is the host lane Lo. In this case, the recognition unit 31 may adopt the location corresponding to the traffic light Sn identified as described above as the location corresponding to the traffic light Sn without particular correction.

In this way, by correcting the location corresponding to the traffic light Sn based on the lane position of the host lane Lo on the travel path Rd1, it is possible to obtain an appropriate position as the location corresponding to the traffic light Sn regardless of the lane position of the host lane Lo on the travel path Rd1.

[4. Example of Processing Procedure by Control Device]

Figure 7:
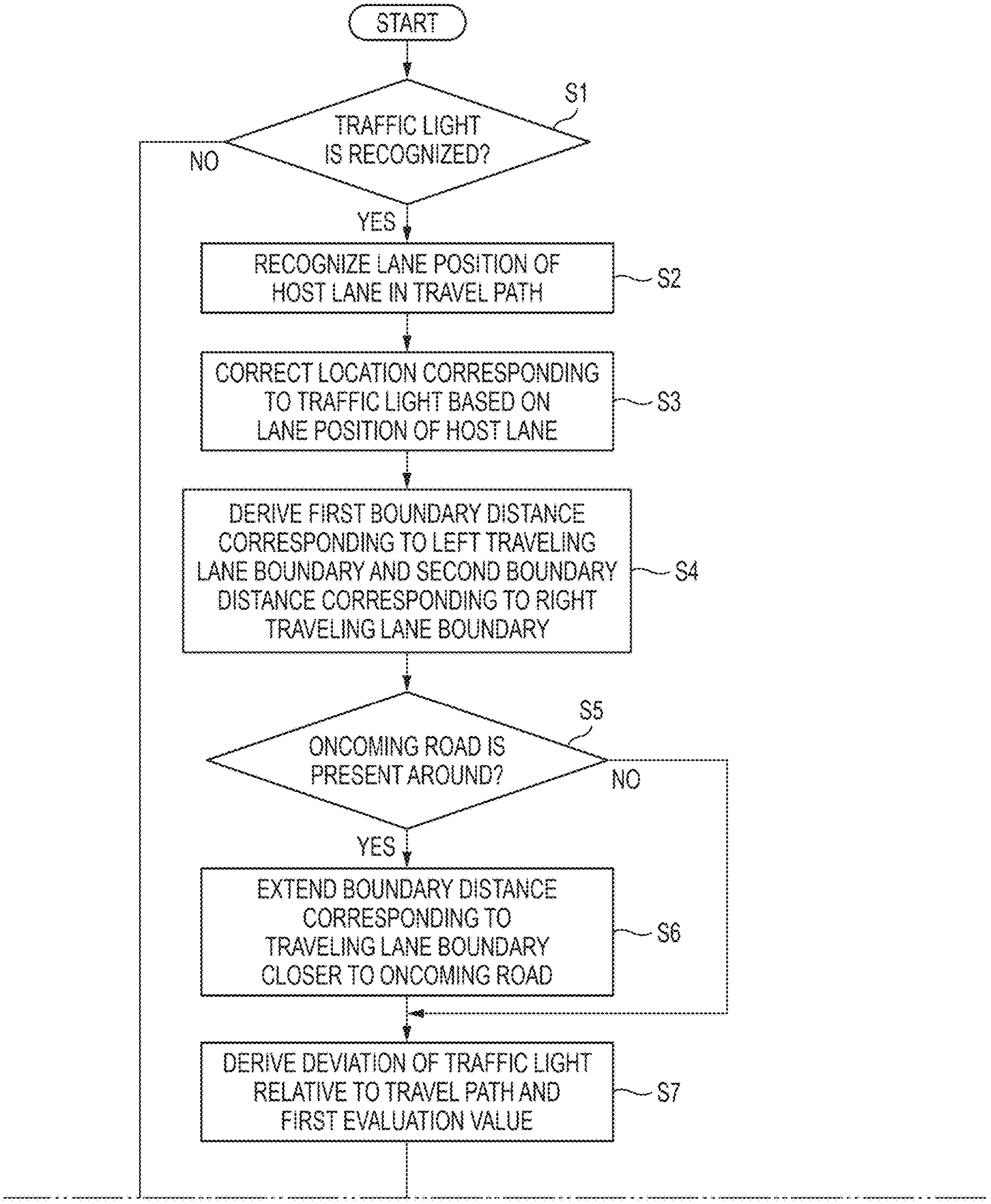
FIG. 7 is a flowchart (part 1) illustrating an example of a processing procedure by the control device 30.
Figure 8:
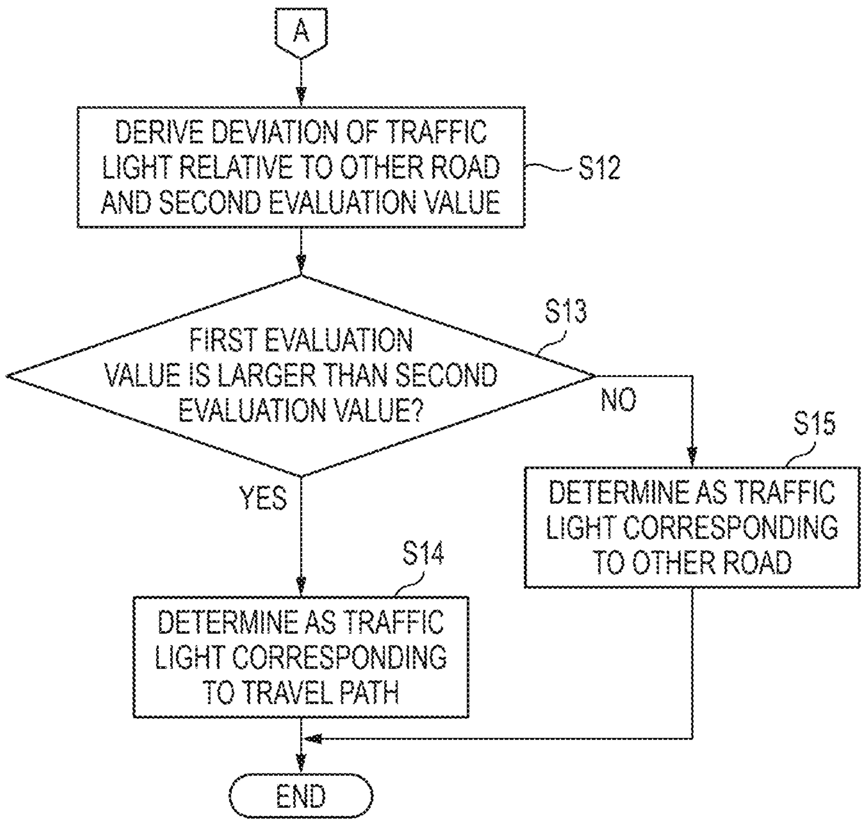
FIG. 8 is a flowchart (part 2) illustrating the example of the processing procedure by the control device 30.

Next, an example of a processing procedure by the control device 30 will be described. FIG. 7 is a flowchart (part 1) illustrating an example of the processing procedure by the control device 30. FIG. 8 is a flowchart (part 2) illustrating the example of the processing procedure by the control device 30. For example, when an ignition power supply of the vehicle 1 is turned on, the control device 30 executes a series of processing illustrated in FIGS. 7 and 8 at a predetermined cycle.

As illustrated in FIG. 7, the control device 30 first determines whether the traffic light Sn present around the vehicle 1 is recognized (step S1). If it is determined that the traffic light Sn is not recognized (step S1: NO), the control device 30 ends the series of processing illustrated in FIGS. 7 and 8.

If it is determined that the traffic light Sn is recognized (step S1: YES), the control device 30 recognizes the lane position of the host lane Lo (that is, the lane in which the vehicle 1 is traveling) on the travel path Rd1 (step S2), corrects the location corresponding to the traffic light Sn based on the recognized lane position of the host lane Lo (step S3), and proceeds to the processing of step S4.

Next, the control device 30 derives the first boundary distance dl corresponding to the left traveling lane boundary L1 and the second boundary distance dr corresponding to the right traveling lane boundary L2 based on the lane number n1 of the travel path Rd1 and the host lane width w (step S4).

Next, the control device 30 determines whether the oncoming road Rd2 is present around the vehicle 1 (step S5). If it is determined that the oncoming road Rd2 is not present around (step S5: NO), the control device 30 directly proceeds to the processing of step S7.

On the other hand, if it is determined that the oncoming road Rd2 is present around (step S5: YES), the control device 30 increases the boundary distance corresponding to the traveling lane boundary closer to the oncoming road Rd2 as compared to a case where the oncoming road Rd2 is not present (step S6), and proceeds to the processing of step S7.

Next, the control device 30 derives the deviation of the traffic light Sn relative to the travel path Rd1 based on the derived first boundary distance dl or second boundary distance dr, and derives the first evaluation value for the traffic light Sn based on the deviation (step S7).

Next, the control device 30 determines whether the recognized traffic light Sn is a traffic light provided at an intersection between the travel path Rd1 and another road (step S8). If it is determined that the traffic light Sn is not a traffic light provided at an intersection between the travel path Rd1 and another road (step S8: NO), the control device 30 determines whether the derived first evaluation value is equal to or greater than a threshold (step S9).

If it is determined that the first evaluation value is equal to or greater than the threshold (step S9: YES), the control device 30 determines that the recognized traffic light Sn is a traffic light corresponding to the travel path Rd1 (step S10), and ends the series of processing illustrated in FIGS. 7 and 8. On the other hand, if it is determined that the first evaluation value is less than the threshold (step S9: NO), the control device 30 determines that the recognized traffic light Sn is not a traffic light corresponding to the travel path Rd1 (step S11), and ends the series of processing illustrated in FIGS. 7 and 8.

If it is determined in the processing of step S8 that the traffic light Sn is a traffic light provided at an intersection between the travel path Rd1 and another road (step S8: YES), the control device 30 proceeds to the processing of step S12 illustrated in FIG. 8, derives the deviation of the traffic light Sn relative to another road, and derives the second evaluation value for the traffic light Sn based on the deviation (step S12). It should be noted that the processing of step S12 can be basically the same as the processing of step S7, but the link used for calculating the traffic light offset amount and the deviation needs to be a link corresponding to another road.

Next, the control device 30 compares the first evaluation value derived by the processing of step S7 with the second evaluation value derived by the processing of step S12, and determines whether the first evaluation value is larger than the second evaluation value (step S13).

If it is determined that the first evaluation value is larger than the second evaluation value (step S13: YES), the control device 30 determines that the recognized traffic light Sn is a traffic light corresponding to the travel path Rd1 (step S14), and ends the series of processing illustrated in FIGS. 7 and 8. Also in this case, the control device 30 may further determine whether the first evaluation value is equal to or greater than a threshold, and determine that the recognized traffic light Sn is a traffic light corresponding to the travel path Rd1 on condition that the first evaluation value is equal to or greater than the threshold.

On the other hand, if it is determined that the first evaluation value is smaller than the second evaluation value (step S13: NO), the control device 30 determines that the recognized traffic light Sn is a traffic light corresponding to another road (step S15), and ends the series of processing illustrated in FIGS. 7 and 8.

As described above, according to the control device 30 of the present embodiment, it is possible to appropriately determine whether the traffic light Sn present around the vehicle 1 is a traffic light corresponding to the travel path Rd1 in consideration of the deviation of the traffic light Sn relative to the travel path Rd1. Therefore, even if no position information on the traffic light or the like is prepared in advance, it is possible to appropriately control the vehicle 1 in accordance with the traffic light corresponding to the travel path Rd1. In addition, it is possible to improve traffic safety and contribute to development of a sustainable transportation system.

The control method described in the present embodiment can be implemented by a computer executing a program (control program) prepared in advance. The control program is stored in, for example, a computer-readable storage medium and executed by being read from the storage medium. In addition, the control program may be provided in a form stored in a non-volatile (non-transitory) storage medium such as a flash memory, or may be provided via a network such as the Internet. In the present embodiment, a computer that executes the present control program is a control device 30 (for example, a processor of the control device 30), but is not limited thereto. The computer that executes the control program may be included in the vehicle 1 or may be included in the external device 2 that can communicate with the vehicle 1.

Although an embodiment of the present invention has been described above, it goes without saying that the present invention is not limited to the embodiment. It is apparent that those skilled in the art may conceive of various modifications and changes within the scope described in the claims, and it is understood that such modifications and changes naturally fall within the technical scope of the present invention.

For example, the method for calculating the deviation and the method of deriving the first evaluation value described in the above-described embodiment are merely examples, and are not limited to the methods of the above-described examples. That is, for example, the method for calculating the deviation is not particularly limited as long as it can quantify the degree that the recognized traffic light Sn deviates from the travel path Rd1. Similarly, the method for deriving the first evaluation value is not particularly limited as long as it can quantify the degree of association between the recognized traffic light Sn and the travel path Rd1.

In the present specification, at least the following matters are described. Although corresponding constituent elements and the like in the above embodiment are shown in parentheses, the present invention is not limited thereto.

(1) A vehicle control device (control device 30) for controlling a vehicle (vehicle 1), including:
- a recognition unit (recognition unit 31) configured to recognize a surrounding situation of the vehicle;
- a deviation calculation unit (deviation calculation unit 32) configured to, if a traffic light is recognized by the recognition unit, calculate a deviation of the traffic light relative to a travel path on which the vehicle travels;
- a determination unit (determination unit 34) configured to determine whether the traffic light is a traffic light corresponding to the travel path based on the deviation calculated by the deviation calculation unit; and
- a vehicle control unit (vehicle control unit 35) configured to control the vehicle based on a determination result of the determination unit.

According to (1), it is possible to appropriately determine whether a traffic light present around the host vehicle is a traffic light corresponding to the travel path in consideration of the deviation of the traffic light relative to the travel path. Therefore, even if no position information on the traffic light is prepared in advance, it is possible to appropriately control the host vehicle in accordance with the traffic light corresponding to the travel path. In addition, it is possible to improve traffic safety and contribute to development of a sustainable transportation system.

(2) The vehicle control device according to (1), in which the deviation calculation unit calculates, as the deviation, a distance between a location corresponding to the traffic light and a traveling lane boundary of the travel path.

According to (2), it is possible to calculate an appropriate value as the deviation of the traffic light relative to the travel path.

(3) The vehicle control device according to (2), in which the vehicle control device is configured to refer to map information (map information database 24) including road network information indicating each road by a combination of nodes and a link connecting the nodes, and the deviation calculation unit sets a line offset from a target link by a first boundary distance to one side in a width direction of the travel path as a traveling lane boundary on the one side of the travel path and sets a line offset from the target link by a second boundary distance to the other side in the width direction of the travel path as a traveling lane boundary on the other side of the travel path, the target link connecting a node closest to the traffic light and a node second closest to the traffic light among the nodes of the travel path, and calculates, as the deviation, a difference between a minimum distance from the target link to the location corresponding to the traffic light and a boundary distance corresponding to a traveling lane boundary closer to the location corresponding to the traffic light between the traveling lane boundary on the one side and the traveling lane boundary on the other side.

According to (3), it is possible to calculate a deviation having a larger value as the location corresponding to the recognized traffic light is farther from the target link beyond the traveling lane boundary of the travel path. Therefore, it is possible to calculate an appropriate value as the deviation.

(4) The vehicle control device according to (3), in which the map information includes information indicating a lane number of each road, and the deviation calculation unit sets the first boundary distance and the second boundary distance based on a length in a width direction of a host lane recognized by the recognition unit and the lane number of the travel path indicated by the map information.

According to (4), even if the recognition unit cannot recognize the entire travel path in the width direction, it is possible to set an appropriate first boundary distance and an appropriate second boundary distance. In addition, even if no information indicating the first boundary distance and the second boundary distance is included in the map information, it is possible to set an appropriate first boundary distance and an appropriate second boundary distance.

(5) The vehicle control device according to (3), in which if an oncoming road whose traveling direction is opposite to the travel path is present around the vehicle, the deviation calculation unit increases the boundary distance corresponding to the traveling lane boundary closer to the oncoming road between the traveling lane boundary on the one side and the traveling lane boundary on the other side as compared to a case where the oncoming road is not present.

According to (5), even if a traffic light corresponding to the travel path is provided closer to the oncoming road, it is possible to prevent a large value from being calculated as the deviation thereof, and to easily determine the traffic light as a traffic light corresponding to the travel path.

(6) The vehicle control device according to (5), in which the map information includes information indicating a lane number of each road, and the deviation calculation unit increases the boundary distance corresponding to the traveling lane boundary closer to the oncoming road based on a length in a width direction of a host lane recognized by the recognition unit and the lane number of the oncoming road indicated by the map information.

According to (6), even if the recognition unit cannot recognize an oncoming road, it is possible to appropriately set the boundary distance corresponding to the traveling lane boundary closer to the oncoming road.

(7) The vehicle control device according to any one of (1) to (6), in which the vehicle control device further includes an evaluation value derivation unit (evaluation value derivation unit 33) configured to derive a first evaluation value indicating a degree of association between the traffic light and the travel path based on the deviation calculated by the deviation calculation unit, and the determination unit determines whether the traffic light is a traffic light corresponding to the travel path based on the first evaluation value derived by the evaluation value derivation unit.

According to (7), it is possible to determine whether the traffic light corresponds to the travel path more accurately than a case where it is simply determined whether the traffic light corresponds to the travel path based on the deviation calculated by the deviation calculation unit.

(8) The vehicle control device according to (7), in which the first evaluation value indicates that the degree of association is higher as the first evaluation value is larger, and takes a maximum value if the deviation is 0, and the evaluation value derivation unit reduces a decrease amount of the first evaluation value per unit deviation if the deviation is within a first range close to 0, and increases the decrease amount of the first evaluation value per unit deviation if the deviation is within a second range farther from 0 than the first range.

According to (8), for example, even if the deviation calculated by the deviation calculation unit varies within the first range (that is, around 0) due to an error based on the recognition accuracy of the recognition unit or the like, it is possible to derive a first evaluation value having a large value, which is likely to be determined as a traffic light corresponding to the travel path. Further, if the deviation is too large to fall within the first range, it is possible to derive a first evaluation value having a small value, which is unlikely to be determined as a traffic light corresponding to the travel path. That is, an appropriate value can be obtained as the first evaluation value regardless of whether the deviation is within the first range.

(9) The vehicle control device according to (7) or (8), in which if the traffic light provided at an intersection between the travel path and another road is recognized, the deviation calculation unit further calculates a deviation of the traffic light relative to said another road, the evaluation value derivation unit further derives a second evaluation value indicating a degree of association between the traffic light and said another road based on a deviation of the traffic light from said another road, and if the first evaluation value is larger than the second evaluation value, the determination unit determines that the traffic light is a traffic light corresponding to the travel path.

According to (9), even if a traffic light is provided at the intersection between the travel path and another road, it is possible to accurately determine whether the traffic light is a traffic light corresponding to the travel path.

(10) The vehicle control device according to (2), in which the recognition unit is configured to recognize the traffic light including a body (body 610) including a plurality of lighting parts (lighting parts 611 to 613) and a support (support 620) supporting the body, and to recognize the body separately from the support, and identifies the location corresponding to the traffic light based on a central position (central position 610*c*) of the recognized body.

According to (10), even if the traffic light includes the support that supports the body (for example, if the support is huge), it is possible to appropriately identify the location corresponding to the traffic light.

(11) The vehicle control device according to (10), in which the recognition unit identifies the location corresponding to the traffic light based on the central position of the body if the body is recognized, and identifies the location corresponding to the traffic light based on a position and a color of the recognized lighting part if the body is not recognized and only one or more among the plurality of lighting parts are recognized.

According to (11), even if the body of the traffic light is not recognized by the recognition unit, it is possible to appropriately identify the location corresponding to the traffic light.

(12) The vehicle control device according to (2), in which the recognition unit corrects the location corresponding to the traffic light based on a lane position of a host lane on the travel path.

According to (12), it is possible to obtain an appropriate position as the location corresponding to the traffic light Sn regardless of the lane position of the host lane on the travel path.

(13) A control method including, by a computer (control device 30) for controlling a vehicle:

recognizing a surrounding situation of the vehicle (step S1);

if a traffic light is recognized, calculating a deviation of the traffic light relative to a travel path on which the vehicle travels (step S7);

determining whether the traffic light is a traffic light corresponding to the travel path based on the deviation (steps S9 and S10); and controlling the vehicle based on a determination result of the determination.

According to (13), it is possible to appropriately determine whether a traffic light present around the host vehicle is a traffic light corresponding to the travel path in consideration of the deviation of the traffic light relative to the travel path. Therefore, even if no position information on the traffic light is prepared in advance, it is possible to appropriately control the host vehicle in accordance with the traffic light corresponding to the travel path. In addition, it is possible to improve traffic safety and contribute to development of a sustainable transportation system.

(14) A control program for causing a computer (control device 30) for controlling a vehicle to perform processing including:

recognizing a surrounding situation of the vehicle (step S1);

if a traffic light is recognized, calculating a deviation of the traffic light relative to a travel path on which the vehicle travels (step S7);

determining whether the traffic light is a traffic light corresponding to the travel path based on the deviation (steps S9 and S10); and controlling the vehicle based on a determination result of the determining.

According to (14), it is possible to appropriately determine whether a traffic light present around the host vehicle is a traffic light corresponding to the travel path in consideration of the deviation of the traffic light relative to the travel path. Therefore, even if no position information on the traffic light is prepared in advance, it is possible to appropriately control the host vehicle in accordance with the traffic light corresponding to the travel path. In addition, it is possible to improve traffic safety and contribute to development of a sustainable transportation system.

REFERENCE SIGNS LIST

1 vehicle
24 map information database (map information)
30 control device (vehicle control device)
31 recognition unit
32 deviation calculation unit
33 evaluation value derivation unit
34 determination unit
35 vehicle control unit

What is claimed is:

1. A vehicle control device for controlling a vehicle, comprising:

at least one hardware processor configured to:

recognize a surrounding situation of the vehicle;

in a case where a traffic light is recognized in the surrounding situation of the vehicle, calculate a deviation amount of the traffic light relative to a travel path on which the vehicle travels;

determine whether the traffic light is a traffic light corresponding to the travel path based on the deviation amount;

control the vehicle based on a result of the determination;

calculate, as the deviation amount, a distance between a location corresponding to the traffic light and a traveling lane boundary of the travel path;

refer to map information including road network information indicating each road by a combination of nodes and a link connecting the nodes;

set a line offset from a target link by a first boundary distance to one side in a width direction of the travel path as a traveling lane boundary on the one side of the travel path and set a line offset from the target link by a second boundary distance to other side in the width direction of the travel path as a traveling lane boundary on the other side of the travel path, the target link connecting a node closest to the traffic light and a node second closest to the traffic light among the nodes of the travel path; and calculate, as the deviation amount, a difference between a minimum distance from the target link to the location corresponding to the traffic light and a boundary distance corresponding to a traveling lane boundary closer to the location corresponding to the traffic light between the traveling lane boundary on the one side and the traveling lane boundary on the other side.

2. The vehicle control device according to claim 1, wherein the map information includes information indicating a lane number of each road, and the at least one hardware processor is further configured to set the first boundary distance and the second boundary distance based on a length in a width direction of a host lane, on which the vehicle travels, recognized in the surrounding situation of the vehicle and the lane number of the travel path indicated by the map information.

3. The vehicle control device according to claim 1, wherein in a case where an oncoming road whose traveling direction is opposite to the travel path is present around the vehicle, the at least one hardware processor is further configured to increase the boundary distance corresponding to the traveling lane boundary closer to the oncoming road between the traveling lane boundary on the one side and the traveling lane boundary on the other side as compared to a case where the oncoming road is not present around the vehicle.

4. The vehicle control device according to claim 3, wherein the map information includes information indicating a lane number of each road, and the at least one hardware processor is further configured to increase the boundary distance corresponding to the traveling lane boundary closer to the oncoming road based on a length in a width direction of a host lane, on which the vehicle travels, recognized in the surrounding situation of the vehicle and the lane number of the oncoming road indicated by the map information.

5. The vehicle control device according to claim 1, wherein the at least one hardware processor is further configured to derive a first evaluation value indicating a degree of association between the traffic light and the travel path based on the deviation amount, and determine whether the traffic light is a traffic light corresponding to the travel path based on the first evaluation value.

6. The vehicle control device according to claim 2, wherein the at least one hardware processor is further configured to derive a first evaluation value indicating a degree of association between the traffic light and the travel path based on the deviation amount, and determine whether the traffic light is a traffic light corresponding to the travel path based on the first evaluation value.

7. The vehicle control device according to claim 3, wherein the at least one hardware processor is further configured to derive a first evaluation value indicating a degree of association between the traffic light and the travel path based on the deviation amount, and determine whether the traffic light is a traffic light corresponding to the travel path based on the first evaluation value.

8. The vehicle control device according to claim 4, wherein the at least one hardware processor is further configured to derive a first evaluation value indicating a degree of association between the traffic light and the travel path based on the deviation amount, and determine whether the traffic light is a traffic light corresponding to the travel path based on the first evaluation value.

9. The vehicle control device according to claim 5, wherein the first evaluation value indicates that the degree of association is higher as the first evaluation value is larger, and takes a maximum value in a case where the deviation amount is 0, and the at least one hardware processor is further configured to reduce a decrease amount of the first evaluation value per unit deviation amount in a case where the deviation amount is within a first range close to 0, and increase the decrease amount of the first evaluation value per unit deviation amount in a case where the deviation amount is within a second range farther from 0 than the first range.

10. The vehicle control device according to claim 5, wherein in a case where the traffic light provided at an intersection between the travel path and another road is recognized, the at least one hardware processor is further configured to calculate a deviation amount of the traffic light relative to the another road, the at least one hardware processor is further configured to derive a second evaluation value indicating a degree of association between the traffic light and the another road based on a deviation amount of the traffic light from the another road, and in a case where the first evaluation value is larger than the second evaluation value, the at least one hardware processor is further configured to determine that the traffic light is a traffic light corresponding to the travel path.

11. The vehicle control device according to claim 1, wherein the at least one hardware processor is further configured to recognize the traffic light including a body including a plurality of lighting parts and a support supporting the body, and is capable of recognizing the body separately from the support, and identify the location corresponding to the traffic light based on a central position of the recognized body.

12. The vehicle control device according to claim 11, wherein the at least one hardware processor is further configured to identify the location corresponding to the traffic light based on the central position of the body in a case where the body is recognized in the surrounding situation of the vehicle, and in a case where the body is not recognized and only one among the plurality of lighting parts is recognized, identify the location corresponding to the traffic light based on a position and a color of the recognized lighting part.

13. The vehicle control device according to claim 1, wherein the at least one hardware processor is further configured to correct the location corresponding to the traffic light based on a lane position of a host lane, on which the vehicle travels, in the travel path.

14. A vehicle control device for controlling a vehicle, comprising:

at least one hardware processor configured to:

recognize a surrounding situation of the vehicle;

in a case where a traffic light is recognized in the surrounding situation of the vehicle, calculate a deviation amount of the traffic light relative to a travel path on which the vehicle travels;

determine whether the traffic light is a traffic light corresponding to the travel path based on the deviation amount;

control the vehicle based on a result of the determination;

derive a first evaluation value indicating a degree of association between the traffic light and the travel path based on the deviation amount; and determine whether the traffic light is a traffic light corresponding to the travel path based on the first evaluation value, wherein the first evaluation value indicates that the degree of association is higher as the first evaluation value is larger, and takes a maximum value in a case where the deviation amount is 0, and the at least one hardware processor is further configured to reduce a decrease amount of the first evaluation value per unit deviation amount in a case where the deviation amount is within a first range close to 0, and increase the decrease amount of the first evaluation value per unit deviation amount in a case where the deviation amount is within a second range farther from 0 than the first range.

15. A vehicle control device for controlling a vehicle, comprising:

at least one hardware processor configured to:

recognize a surrounding situation of the vehicle;

in a case where a traffic light is recognized in the surrounding situation of the vehicle, calculate a deviation amount of the traffic light relative to a travel path on which the vehicle travels;

determine whether the traffic light is a traffic light corresponding to the travel path based on the deviation amount;

control the vehicle based on a result of the determination;

derive a first evaluation value indicating a degree of association between the traffic light and the travel path based on the deviation amount;

determine whether the traffic light is a traffic light corresponding to the travel path based on the first evaluation value;

in a case where the traffic light provided at an intersection between the travel path and another road is recognized, calculate a deviation amount of the traffic light relative to the another road;

derive a second evaluation value indicating a degree of association between the traffic light and the another road based on a deviation amount of the traffic light from the another road; and in a case where the first evaluation value is larger than the second evaluation value, determine that the traffic light is a traffic light corresponding to the travel path.

* * * * *